United States Patent [19]
Yoshikawa et al.

[11] Patent Number: 5,888,352
[45] Date of Patent: Mar. 30, 1999

[54] APPARATUS FOR WET MANUFACTURING FIBER REINFORCED THERMOPLASTIC RESIN SHEET

[75] Inventors: Fumiaki Yoshikawa; Seiji Hanatani, both of Tokyo; Yuichi Uchida, Chiba; Tsuguo Takehara, Okayama; Isamu Shiota, Chiba, all of Japan

[73] Assignee: Kawasaki Steel Corporation, Japan

[21] Appl. No.: 697,054

[22] Filed: Aug. 19, 1996

[51] Int. Cl.⁶ .................................................. P21F 1/02
[52] U.S. Cl. ........................... 162/336; 162/338; 162/343
[58] Field of Search .................................. 162/338, 343, 162/336

[56] References Cited

U.S. PATENT DOCUMENTS

| | | | |
|---|---|---|---|
| 2,970,644 | 2/1961 | Webster | 162/338 |
| 3,234,078 | 2/1966 | Goldsmith | 162/336 |
| 3,296,066 | 1/1967 | Green et al. | 162/338 |
| 3,357,879 | 12/1967 | Bennett | 162/336 |
| 3,471,368 | 10/1969 | Reitzel | 162/336 |
| 3,640,843 | 2/1972 | Means | 162/343 |

FOREIGN PATENT DOCUMENTS

| | | |
|---|---|---|
| 0 148 760 A2 | 7/1985 | European Pat. Off. . |
| 4005281 | 8/1991 | Germany ................................ 162/343 |
| 705715 | 3/1954 | United Kingdom .................... 162/338 |
| 1026276 | 4/1966 | United Kingdom . |
| 1105690 | 3/1968 | United Kingdom . |
| WO 83/00173 | 1/1983 | WIPO . |

Primary Examiner—Robert Davis
Attorney, Agent, or Firm—Austin R. Miller

[57] ABSTRACT

The present invention provides an apparatus for wet manufacturing a fiber reinforced thermoplastic resin sheet, having a manifold capable of uniformly distributing the solid concentrations without being affected by inertia force caused by the difference in shape between solids. The invention further provides an apparatus for wet manufacturing a fiber reinforced resin sheet having a buffer inlet or reservoir headbox capable of permitting inhibition of variations of the unit weight distribution under the effect of the dynamic pressure of the raw material dispersing liquid and the resultant fluctuations.

24 Claims, 12 Drawing Sheets

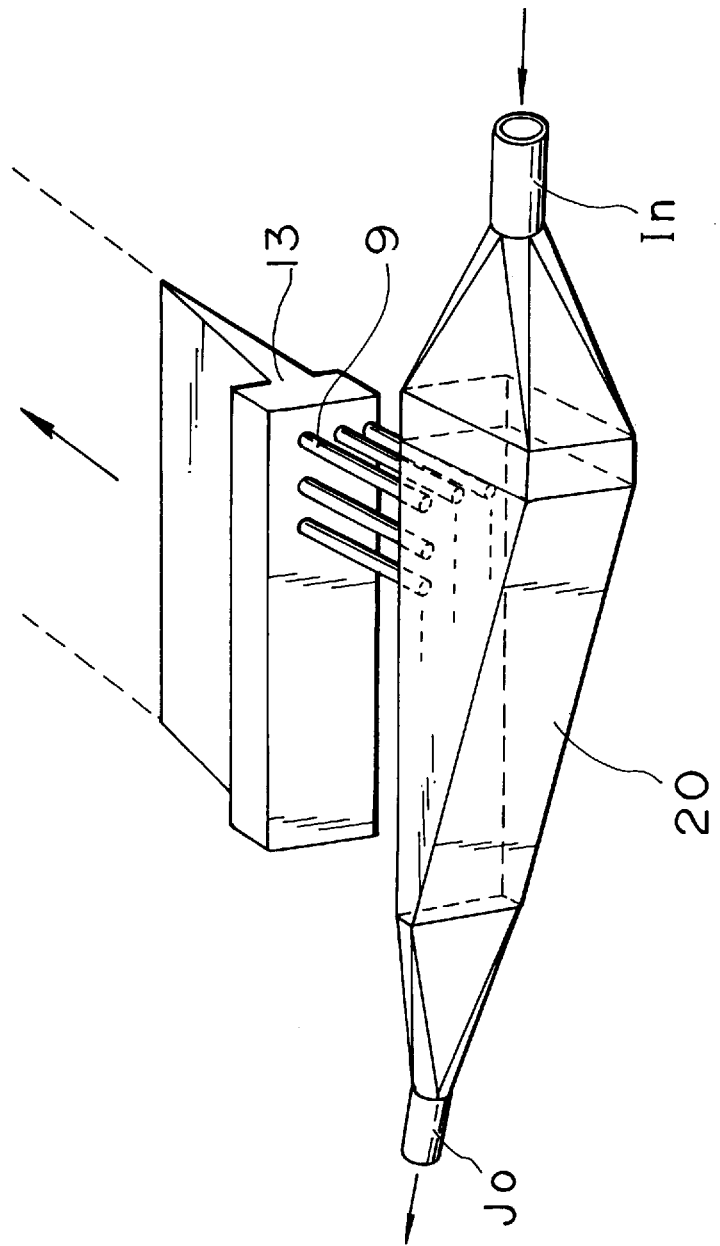

PRIOR ART

APPARATUS FOR WET MANUFACTURING FIBER REINFORCED THERMOPLASTIC RESIN SHEET

BACKGROUND OF THE INVENTION

1. Field of the Invention

The present invention relates to an apparatus and a method for manufacturing a fiber reinforced thermoplastic resin sheet. More particularly, the present invention relates to an apparatus for manufacturing a fiber reinforced thermoplastic resin sheet, which can uniformly distribute solid concentration without being affected by inertia forces, and can permit inhibition of variations of unit weight distribution of a web under the effect of the dynamic pressure of the raw material dispersing liquid and the resultant fluctuations. This invention also relates to a method for manufacturing the novel fiber reinforced thermoplastic resin sheet.

2. Description of the Related Art

Attempts have been made to impart high strength and a high toughness value to a thermoplastic resin while retaining processing advantages. Composite material technology has been applied, based on addition to a resin of a fiber having a high modulus of elasticity. Resultant fiber reinforced thermoplastic composite materials have been employed as materials for various structural members required to have light weight, a high toughness value and a high value of strength. These materials are usually heated to above the melting point of the thermoplastic resin, followed by addition of the matrix, and the resulting composite is then formed into a prescribed shape.

Among other composites, plate-shaped or sheet-shaped materials suitable for forming on a press or for forming a large-sized part are known as stampable sheets. Stampable sheets are widely used in automotive structural parts such as seat backs, rear packages and integrally formed automobile ceilings. They achieve a lighter weight and reduce cost. They often reduce the number of necessary parts and of assembly processes. Composite technology is further expanding to include other parts than those mentioned above.

A so-called wet manufacturing method using paper-making technology is known as a typical manufacturing method of making a stampable sheet. This method comprises dispersing fiber chips and a thermoplastic resin in an aqueous solution (dispersing step), preparing a nonwoven fabric-like web by use of paper-making technology by dispersing liquid on a mesh belt (web forming step), and solidifying the web achieved after applying heat and pressure (sheet making step), thereby manufacturing a stampable sheet. A continuous manufacturing method is disclosed in, for example, Japanese Unexamined Patent Publication No. 6-158227.

A web of a stampable sheet based on the paper-making method can be continuously manufactured as follows by the use of a manufacturing apparatus as shown in FIG. 1 of the drawings.

The apparatus shown in FIG. 1 broadly comprises a material preparing section 1, a web-forming section 10, a drying section 40, and a take-up section 50.

A dispersion tank 3 is provided with a stirrer 2 in the material preparing section 1, and a resin feeder 4 feeds stored thermoplastic resin while a reinforcing fiber feeder 5 feeds stored reinforcing fibers from above the dispersion tank 3.

The thermoplastic resin of the resin feeder 4 and the reinforcing fiber of the reinforcing fiber feeder 5 are charged at a prescribed ratio into the dispersion tank 3, which is filled with an aqueous solution containing a surfactant or a viscosity enhancing agent and stirred to prepare a dispersing liquid C serving as a raw material liquid. The thus prepared dispersing liquid C is sucked out of tank 3 by a metering pump 6, and is distributed by a distributor 20 called a manifold into a plurality of branch pipes 9, and then conducted to the web-making section 10. (FIG. 1 shows only one branch pipe 9 extending to inlet 30 for ease of understanding.)

The web-forming section 10 includes at least the following components: a continuously moving endless mesh belt 11, a suction box 12 arranged in contact with the back thereof, and a headbox 13 for storing the dispersing liquid C sent from the material preparing section 1 and supplying the same onto the mesh belt 11. The dispersing liquid C is sent through an inlet 30 to the headbox. The mesh openings of the mesh belt 11 are smaller than the diameter of the reinforcing fiber and the thermoplastic resin. The dispersing liquid C is sucked by the suction box 12 under reduced pressure, and the reinforcing fiber and the thermoplastic resin are converted into a sheet shape (filtered) onto the mesh belt having mesh openings smaller than the particle size of the thermoplastic resin. The mixture in the form of a nonwoven fabric of the reinforcing fiber and the thermoplastic resin thus made into sheets is called a web. The web W, being in a wet state at this point, is passed through a drying section 40.

In the present invention, an inlet and a headbox are arranged very close to each other and they are sometimes referred to as a "distributor".

The drying section 40 has a belt conveyor 41 and a drying chamber 42 connected together downstream of the mesh belt 11, and continuously dries the web W. During the drying process, the resin is melted by removing moisture and changing the temperature of the resin to at least the melting point of the thermoplastic resin to strengthen intertwinement of the reinforcing fiber. The resultant dried web has a high fracture resistance and is excellent in form stability, and is wound to a roll shape on a take-up roll 51 of a take-up section 50.

It is possible, as desired, to impregnate fibers with the thermoplastic resin by cutting and then heat-pressing the web. The product in this state is called a "consolidated sheet." This consolidated sheet is generally used as a forming material.

The quality and properties of a stampable sheet based on the paper-making method are mostly determined during the web-forming step. Also, keeping a uniform unit weight distribution in the web is particularly important in order to reduce any differences in thickness or in the content of the reinforcing fiber and to reduce fluctuations in properties.

Patterns of unit weight distribution are broadly classified into those occurring in the longitudinal direction of the manufacturing line (hereinafter sometimes referred to as the "line direction") and those occurring in the width direction. The former are often attributable to pulsations in the raw material supply system typically represented by a pump, and techniques to prevent this are known. In order to avoid a nonuniform unit weight distribution in the width direction, it is necessary to uniformly expand the raw material (liquid) sent usually through a single pipe. This problem could not, however, be easily solved in the wet manufacturing method of stampable sheets as described later.

Furthermore, the unit weight distribution in the width direction exerts an important effect also on the orientation of the reinforcing fiber for the following reason. When a change occurs in the unit weight distribution in the width direction, the raw material dispersing liquid supplied to the headbox naturally flows into a portion with a smaller unit weight value and a smaller suction resistance, and this causes production of a channelling effect. Because fibers are oriented along the direction of flow, channelling takes place and leads to local abnormal orientation of the fibers, and eventually results in a camber, arching, curvature or the like of the stampable sheet.

In other words, achievement of a uniform unit weight distribution in the width direction is a prerequisite for obtaining sheets having uniform properties.

A uniform unit weight distribution in the width direction can be achieved by using uniform chemical compositions of solids (reinforcing fiber and thermoplastic resin) in the dispersing liquid and supplying the dispersing liquid onto the sheet-making surface with a flow rate that is uniform in the width direction. The manifold and the inlet serve this function.

Problems involved with the manifold and the inlet in currently used wet-type apparatus and solutions to those problems according to the present invention will be described below.

Conventional manifold

The function of the manifold 20 (as shown in FIG. 1) is to supply the dispersing liquid at a flow rate and a solid concentration that is essentially uniform in the width direction of the inlet 30. That is, the manifold 20 serves to widen the flow of the dispersing liquid directed toward the headbox 13 from the dispersing tank 3 through the piping, in the width direction.

The shapes of various manifolds have conventionally been studied from various points of view. In the paper industry, which faces its own specific problems, it is the general practice to use a taper-type manifold of which the cross-sectional area gradually decreases as disclosed in the Journal of the Japan Society of Paper/Pulp technology (published on Jan. 1, 1993), Vol. 47, No. 1, p. 102. An outline of this manifold is illustrated in FIG. 9. According to the literature, the flow rate distribution in the width direction of the headbox 13 is very uniform. Solids are almost exclusively pulp (wood fiber) and there is no problem in the uniform distribution of its concentration.

The foregoing taper-type manifold has been used with very different technology in conventional wet manufacturing apparatus of fiber reinforced thermoplastic resin sheets. However, when using a taper-type manifold for making of stampable sheet, the concentration distribution of solids was not necessarily accomplished uniformly as in the pulp concentration.

The reinforcing fiber and the thermoplastic resin composing a stampable sheet usually have different values of specific gravity and geometric shapes. Typical reinforcing fibers include glass fiber, carbon fiber, and stainless steel fiber. In the case of glass fiber, for example, those having a specific gravity of about 2.54 and an aspect ratio (fiber length/fiber diameter) within a range of from about $1 \times 10^6$ to $5 \times 10^6$ are used.

Thermoplastic resins serving as the matrix have, on the other hand, a specific gravity within a range of from about 0.9 to 1.5. For the purpose of reducing the manufacturing cost, it is the usual practice to use a granular shape having a size of about 1 mm, the aspect ratio being about 2 as a maximum.

As shown in FIG. 9, the conventional taper-type manifold turns the direction of the dispersing liquid flowing into it through the inlet port at a right angle, and sends the liquid through the branch pipes 9 to the headbox 13. At this point, the solids in the liquid are under the effect of an inertia force depending upon the shape thereof (aspect ratio). More specifically, because the thermoplastic resin has an aspect ratio that is far smaller than that of a reinforcing fiber (resulting in a larger inertia), the turning of direction near the discharge exit to the branched pipes 9 becomes insufficient and the resin tends to be thrown toward the circulation flow exit Jo. As a result, the thermoplastic resin segregates near the tip of the taper-type manifold. In contrast the reinforcing fibers that have a large aspect ratio (resulting in a smaller inertia) easily follow the flow of the dispersing liquid, causing no segregation. Accordingly, non-uniform concentrations of solids occur in the interior of the manifold because of the inertia differences.

In the conventional wet manufacturing apparatus of stampable sheets, this non-uniform concentration causes a non-uniform unit weight distribution in the width direction of the web, and this in turn causes non-uniformity of mechanical properties such as bending strength and bending elastic modulus of the product sheet, and further causes variations of quality such as non-uniform thicknesses.

Conventional inlet

As shown in FIG. 1, the dispersing liquid distributed at the manifold 20 into the branched pipes 9 is directed to the inlet 30, where the flows meet, and is sent to the mesh belt 11 as a two-dimensional flow. In other words, the inlet 30 may be considered an apparatus which converts the dispersing liquid sent in the form of a plurality of "lines" from the manifold 20 into a "plane" flow and supplies it to the mesh belt 11.

In the conventional wet manufacturing apparatus of stampable sheets, it is the common practice to use a larger-volume inlet 30 to cause the dispersing liquid C to display fully its mixing and straightening effects, with a view to making a web having a uniform unit weight distribution.

However, with an inappropriate increase in volume at the inlet 30, it is impossible to control fluctuations in the flow leaving the exit, and the problem of promoting fluctuation is posed. The fluctuation as referred to herein is a phenomenon in which the flow does not run straight from the exit in the line direction, but horizontally deviates right and left. Occurrence of this fluctuation is attributable mainly to variations of dynamic pressure and flow rate of the dispersing liquid C.

Another problem is one that is intrinsic in the wet manufacturing process. In a wet manufacturing method in which the reinforcing fiber and the thermoplastic resin are transported by a foamed liquid, and wherein there exists the presence of a portion at which the flow velocity decreases, the liquid often separates into a portion containing a large foam content (a high air content) and into another portion containing the aqueous solution without substantial foam. This foam reduces the solid transporting capability of the dispersing liquid and makes it very difficult to achieve a uniform concentration and a uniform unit weight distribution. This decrease in flow velocity of the dispersing liquid tends to occur particularly when the inlet has a structure in which stagnation of the dispersing liquid occurs.

In the wet manufacturing method, therefore, a very difficult task is presented that requires inhibiting the large dynamic pressure of the dispersing liquid and straightening the flow, all without reduction of flow velocity.

SUMMARY OF THE INVENTION

It is one object of the present invention to provide an apparatus for wet manufacturing a fiber reinforced thermoplastic resin sheet having a novel manifold capable of uniformly distributing the solid concentrations without being affected by inertia forces caused by differences in shapes between solids.

Another object of the present invention is to provide an apparatus for wet manufacturing a fiber reinforced resin sheet having a novel buffer inlet or reservoir headbox capable of inhibition of variations of unit weight distribution under the effect of the dynamic pressure of the raw material dispersing liquid and the resultant fluctuations.

BRIEF DESCRIPTION OF THE DRAWINGS

FIG. 3A is a sectional view; and FIG. 3B is a plan view;

FIG. 4A is a sectional view; and FIG. 4B is a plan view;

FIG. 7A is a sectional view; FIG. 7B is a plan view; and FIG. 7C is a plan view of the inlet of another embodiment of the present invention;

FIG. 8A is a sectional view of the headbox of one embodiment 3; FIG. 8B is a sectional view of the headbox of an embodiment 4; and FIG. 8C is a back view of the headbox of the embodiment shown in FIG. 8B;

FIG. 9 is a perspective view illustrating a conventional taper-type manifold;

FIG. 10A shows a portion including a partition; and FIG. 10B shows a portion not containing a partition;

DESCRIPTION OF PREFERRED EMBODIMENTS

Figure 1:
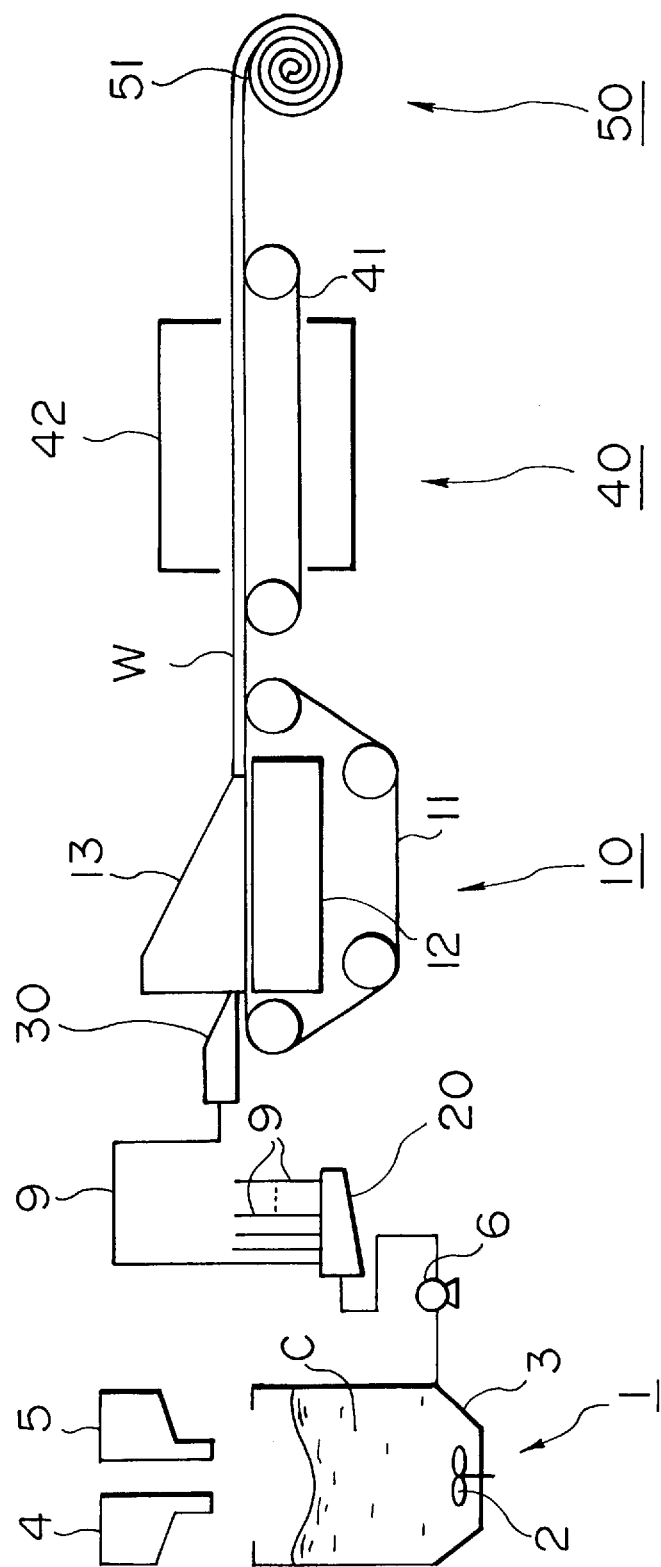
FIG. 1 is a schematic view of a conventional apparatus for manufacturing a fiber reinforced thermoplastic resin sheet.

It will be appreciated that the following description is intended to refer to the specific embodiments of the invention selected for illustration in the drawings and is not intended to define or limit the invention, other than in the appended claims.

With a conventional taper-type manifold, it is difficult to distribute granular solids having a large inertia force uniformly across the width direction of the headbox.
Manifold of the present invention In order to overcome this problem, we have found it advantageous to provide a manifold structure which permits avoidance of the effect of inertia acting on solids with achievement of a substantially constant distance between an inlet port to supply/distributing ports. On the basis of these findings, we have found that a manifold having a shape of a rotor having a substantially vertical rotation axis (hereinafter referred to as a "vertical axis rotor") is effective for uniform distribution of solids and, particularly of granular solids having a large inertia force.

Figure 2:
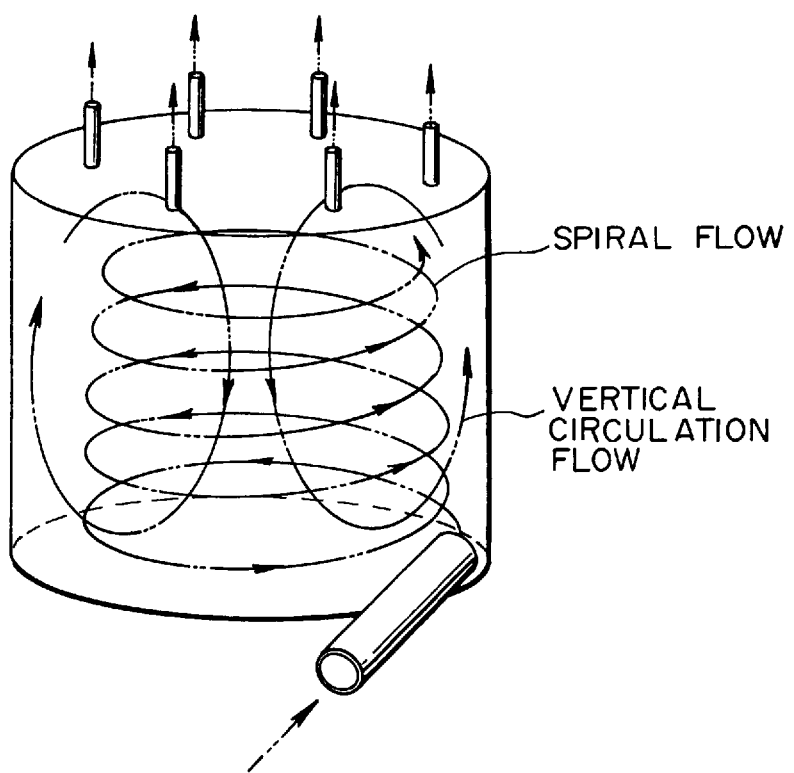
FIG. 2 is a perspective view illustrating the flow of the dispersing liquid in the interior of the manifold of one embodiment of the present invention.

The manifold of the present invention has a shape of a vertical axis rotor and is provided with distribution flow exits (hereunder sometimes referred to as "outlets") of substantially equal diameter at the same height. The expression "vertical axis rotor" as herein used means a solid body having an axisymmetrical shell with a substantially vertical axis as the center. The most simple vertical axis rotor is a cylinder having all the sides forming axisymmetry planes, with plane upper and lower faces. Various other shapes are possible. For example, the upper and lower faces may be conical or hemispherical faces, not necessarily planes. By adopting a vertical axis rotor shape, a rotary (spiral) flow as schematically shown in FIG. 2 or a radial vertical circulation flow is easily produced. At this point, mainly a centrifugal force depending upon the distance from the center axis of the vertical axis rotor (hereinafter simply referred to as the "center axis") acts on the reinforcing fiber and the thermoplastic resin in the dispersing liquid. It is thus possible to prevent the disadvantageous effect of inertia force as in a conventional taper-type manifold.

Furthermore, the solids in the dispersing liquid come up along the axisymmetrical curved surface under the effect of the foregoing flow and reach distribution flow exits at the same height. Irrespective of the distribution flow exits, therefore, the locus from an inlet port of the dispersing liquid becomes substantially identical for all the flows from all of the exits. The flows of the dispersing liquid are, therefore, uniformly discharged with the same solid concentration from all the distribution flow exits.

The ratio of the height to diameter of the manifold having the foregoing substantially vertical axis rotor shape is variable with properties of the dispersing liquid. For example, this ratio should preferably be within a range of from about 0.3 to 3 for a simple cylinder.

The manifold may have an inlet port at a lower portion thereof for introducing the dispersing liquid in a direction tangential to the axisymmetry curved face. It is thus possible to produce a rotating (spiral) flow and a vertical circulation flow as schematically shown in FIG. 2. For the purpose of efficiently producing these flows, it is effective to make the lower surface conical or hemispherical. With a view to causing the rotating flow to flow throughout the entire interior of the manifold, the distribution flow exits should preferably be the closest to the bottom of the manifold. To ensure a sufficient moving distance between the dispersing liquid inlet port and the distribution flow exits, the manifold should preferably have a length of at least five times the inside diameter of the supply pipe of the raw material dispersing liquid.

Figure 4A:
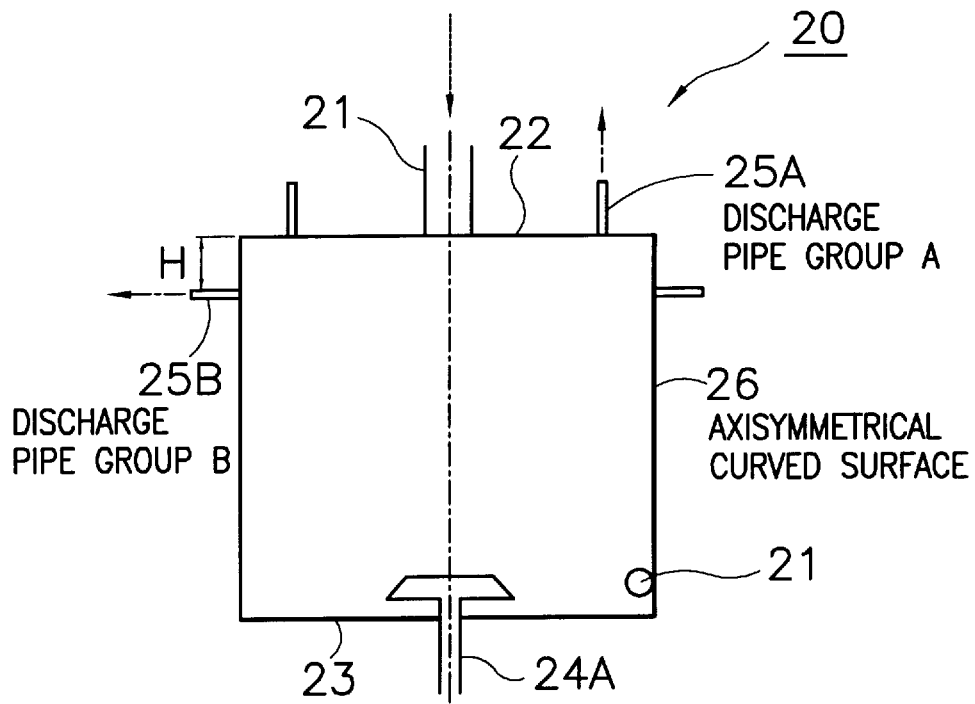
FIGS. 4A and 4B illustrate another embodiment of a manifold of the apparatus 1 of the present invention.

The manifold may have, on the other hand, an inlet port for introducing the dispersing liquid from substantially vertically above along the center axis. As shown in FIG. 4A, the dispersing liquid entering through the inlet port 21 comes down along the center axis, then comes up under guidance of the axisymmetrical curved surface 26 of the inner shell, and is directed to the distribution flow exits 25. Consequently, as substantially vertical circulation flow is easily formed in the manifold, the locus of the reinforcing fiber and the thermoplastic resin from the inlet port is substantially the same for any of the distribution flow exits. This means that the dispersing liquid has a uniform solid concentration as it flows out of the distribution flow exits.

Figure 4B:
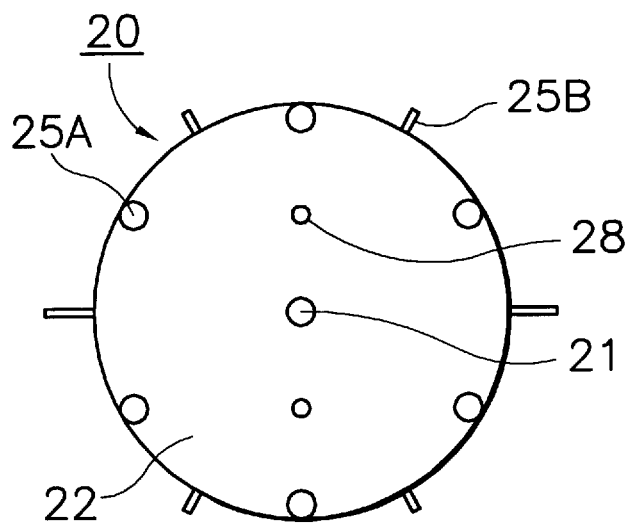

The foregoing manifold may be provided with a horizontally rotating stirrer. The stirring shaft of the stirrer should substantially align with the center axis of the manifold. FIGS. 4A and 4B illustrate an example. Under the effect of this stirring, a rotating flow and a vertical circulation flow similar to those schematically shown in FIG. 2 can be produced, thus achieving uniform distribution of solids in the dispersing liquid. It is preferable to use any of a variety of stirring blades which have the function of pushing the liquid flow in the radial direction. Turbine-type, propeller-type and paddle-type blades are also possible.

To cause the rotating flow to reach every corner in the manifold, the stirring blades 24a should preferably be as close as possible to the bottom of the manifold. Installation of the stirrer has a further effect of inhibiting secondary cohesion of the reinforcing fibers. The diameter ratio of the manifold to the stirring blades is determined so as to produce a rotating flow effective for uniform distribution of solids. In the case of the simplest cylinder, this ratio is preferably within a range of from about 1.5 to 5.

The manifold may be provided with distribution flow exits at equal intervals on a substantially concentric circle around the center axis as the center of the circle. By using this arrangement, the flow distances of the solids flowing on the rotating flow to the individual distribution flow exits on the concentric circles become substantially equal, and the concentration of the discharged liquid becomes very uniform.

The liquid may be a foamed dispersing liquid. Although it is possible to employ embodiments of the invention with a dispersing liquid containing no foam, the use of a foamed dispersing liquid inhibits separation since solids having considerable differences in shape or specific gravity can be simultaneously caught by surfaces of foams, thus permitting maintenance of a uniform mixed condition during liquid transportation.

Figure 3A:
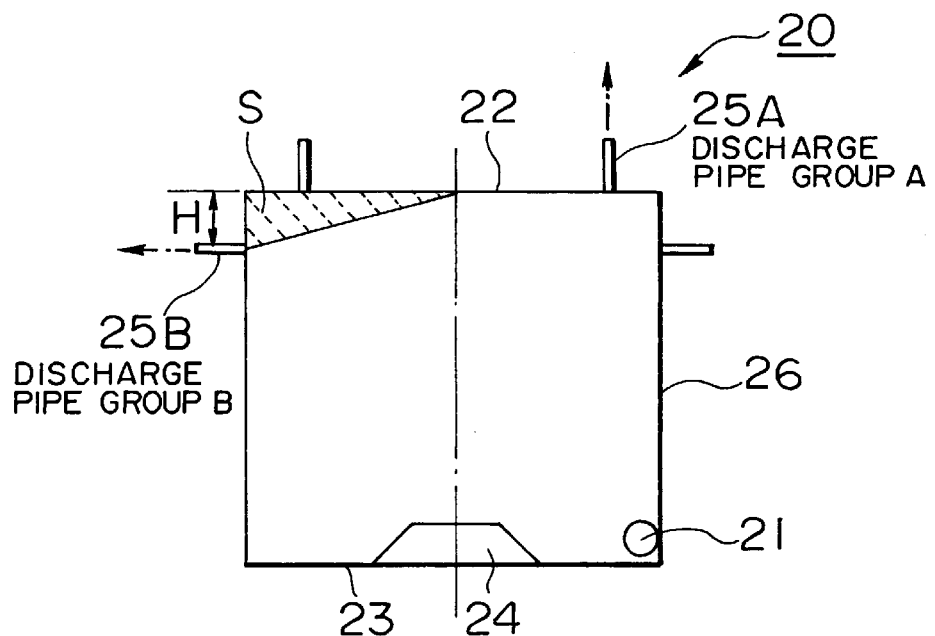
FIGS. 3A and 3B illustrate an embodiment manifold of the apparatus 1 of the present invention.

When using a foamed dispersing liquid, however, the problem of separation of foams from water is separately posed. We have found that the dispersing liquid in the manifold was sometimes divided into a portion having the same chemical composition as the incoming dispersing liquid and another portion (bubble retaining region) S in which many bubbles segregate as separate portions, as shown in FIG. 3A. While reinforcing fibers can be present in this bubble retaining region S, there is little or no granular thermoplastic resin present. A mixture of the dispersing liquid and the bubble retaining region flows out from each distribution flow exit. From an exit with a high mixing ratio of the bubble retaining region, a foamed dispersing liquid having a high concentration of reinforcing fibers flows out. This means that occurrence of a bubble retaining region S causes non-uniform distribution of the solids.

Occurrence of such a bubble retaining region can be effectively prevented by first keeping the dispersing liquid in a flow condition throughout all regions in the manifold. For this purpose, it is important to control appropriate dispersing liquid flow conditions and appropriate operating conditions of the horizontally rotating stirrer, taking account of the size of the manifold. Considering the fact that the bubble retaining region is segregated in the upper layer of the dispersing liquid, it is also effective to prevent growth of the bubble retaining region by arranging distribution flow exits of the dispersing liquid in the upper portion of the manifold as much as possible.

With a view to eliminating the foregoing bubble retaining region, the manifold may be arranged vertically upward with distribution flow exits on the upper surface of the manifold. This ensures vertically upward discharge of floating bubbles together with the dispersing liquid, and no bubble is retained in the manifold.

Inlet of the present invention

In the buffer-type inlet of the present invention, the most important point for achieving a uniform flow rate of the dispersing liquid over the entire width of the mesh belt and discharging it onto the mesh belt is to reduce the dynamic pressure of the dispersing liquid which is branched at the manifold into a plurality of flows and sharply supplied to the inlet side.

Figure 7A:
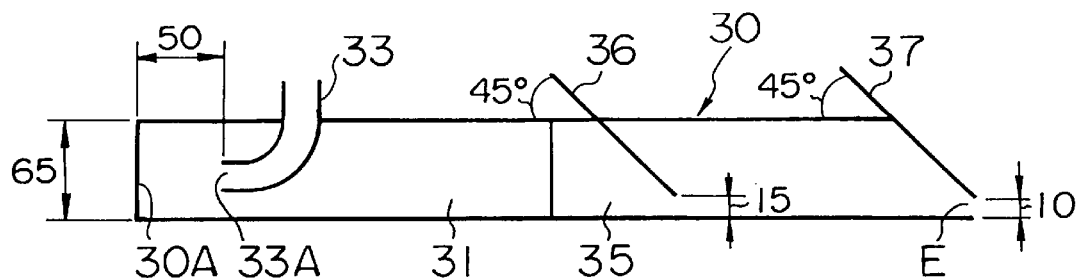
FIGS. 7A, 7B and 7C illustrate the inlets of several embodiments of the present invention.
Figure 7B:
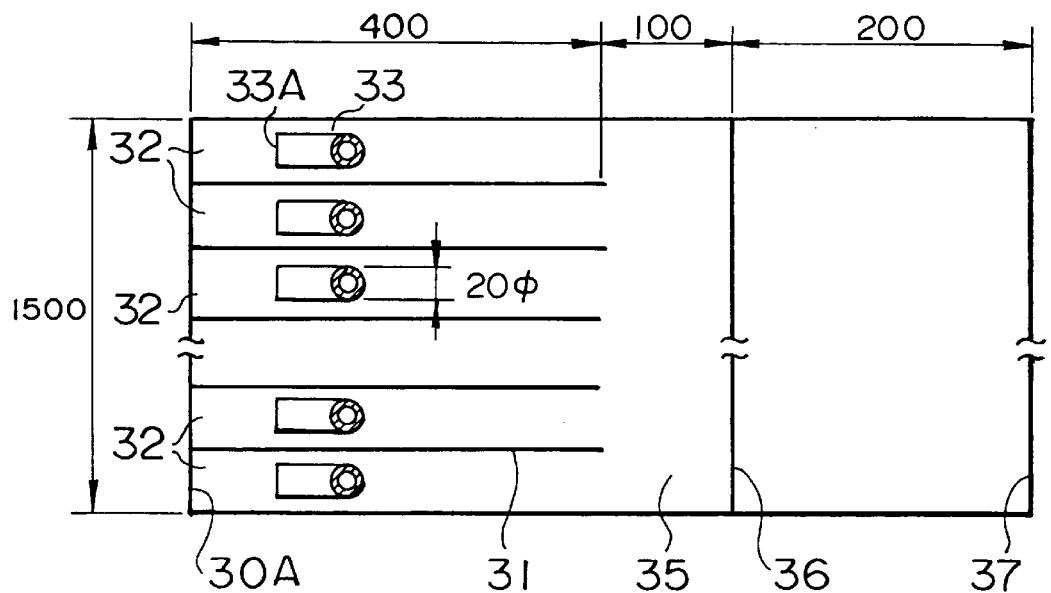
Figure 7C:
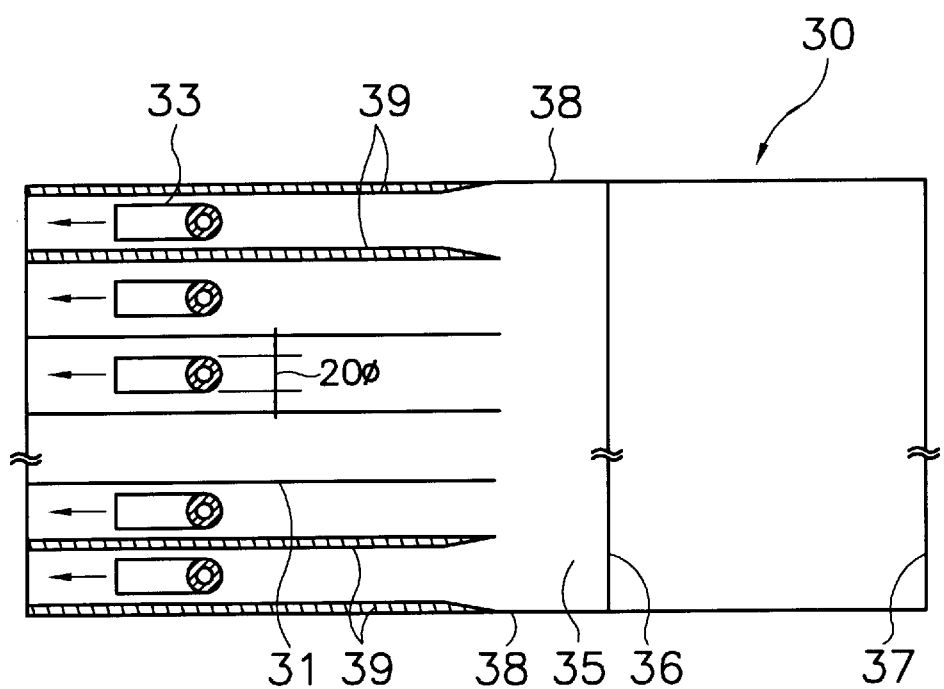

In the buffer-type inlet, reduction of the dynamic pressure of the dispersing liquid is achieved by causing the dispersing liquid supplied from the manifold to the inlet to collide at least once with a dispersing liquid deflecting or disturbing face opposed to dispersing liquid inlet ports in the vicinity thereof, thereby changing the flow direction. In the case of a box-shaped inlet as shown in FIGS. 7A, 7B and 7C, for example, the dispersing liquid deflecting face may be arranged on any of the front, upper, lower and rear inner walls. The dynamic pressure reducing effect is more remarkable in the order shown above. By collision with the disturbing face, the dynamic pressure of the flow ejected from the branched pipes 9 is dampened by converting it into energy of disturbance.

In order to straighten the flow of the dispersing liquid after the dynamic pressure has been converted into energy of disturbance, i.e., into a wavy rolling in the foregoing inlet, the flow is caused to pass through a slot-shaped dispersing liquid discharge exit E (FIG. 7A) which is long in the width direction and narrow in the height direction.

The size of the slot-shaped opening, i.e., the degree of opening may be determined taking account of the supply flow rate and the flow velocity of the dispersing liquid to the inlet.

In the inlet, for example as shown in FIGS. 6 or 7A, 7B, 7C, dispersing liquid inlet ports are arranged with their openings in a direction opposite to the line direction. This is effective. It is possible to efficiently inhibit the dynamic pressure of the ejected flow by causing the flow ejected from the branched pipes 33 to collide with the rear wall surface, such as wall surface 30A in FIGS. 7A and 7B, to change the flow direction by about 180°.

In the inlet as described above, the buffer effect on the deflecting face can be improved by reducing the amount of fluctuation of the flow (horizontal deviation of the flow). For this purpose, FIGS. 7A and 7B the flows of the dispersing liquid flowing through the branched pipes 33 into the inlet are not allowed to rejoin immediately, but are introduced into small channels formed by equally dividing inlet ports by means of partitions 31. More specifically, as shown in FIGS. 7A, 7B and 7C for example, the inlet is divided by longitudinally oriented partitions 31 spaced apart in the width direction into a plurality of sections, and the dispersing liquid is introduced into each of the thus formed small channels 32. This limits the amount of flow disturbance and fluctuation to the sizes of the small channels, facilitating control. Each channel is completely independent of the others to prevent mixture of the individual flows.

Figure 10A:
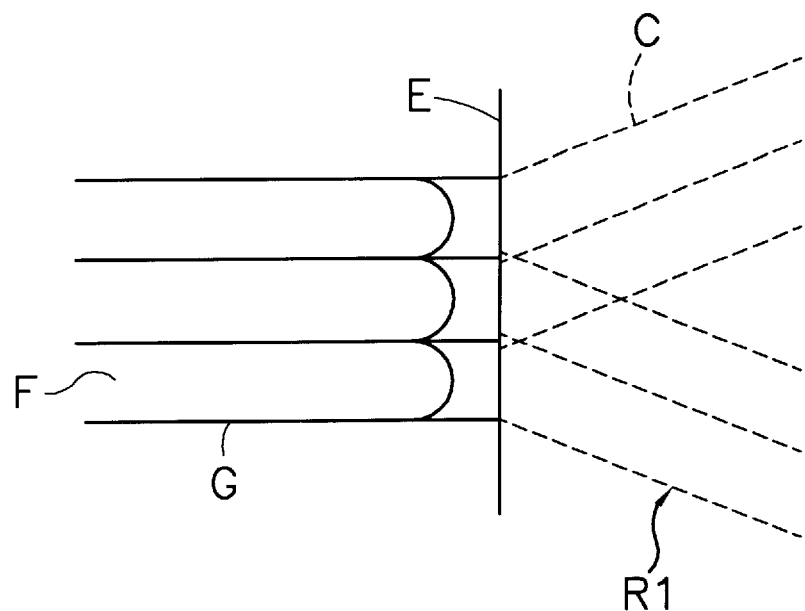
FIGS. 10A and 10B are partial plan views illustrating a portion near the slit-shaped opening of the inlet in accordance with aspects of the invention.

In the inlet, furthermore, for the purpose of sending a flat flow on the flow front onto the mesh belt, the flows of the dispersing liquid are caused to join each other downstream of each section 32 (in the present invention, the direction of the incoming dispersing liquid is defined as upstream, and that of the leaving liquid, as downstream) and before the slot-shaped opening (hereinafter sometimes referred to as the "upstream side"). If the dispersing liquid flows having passed through the sections are not allowed to join but as shown in FIG. 10A, are directly passed through the slot-shaped exit E, the presence of thickness of the partitions between the individual sections F tends to form a diagonal flow R1 on the mesh belt, thus preventing achievement of a uniform unit weight distribution.

Figure 10B:
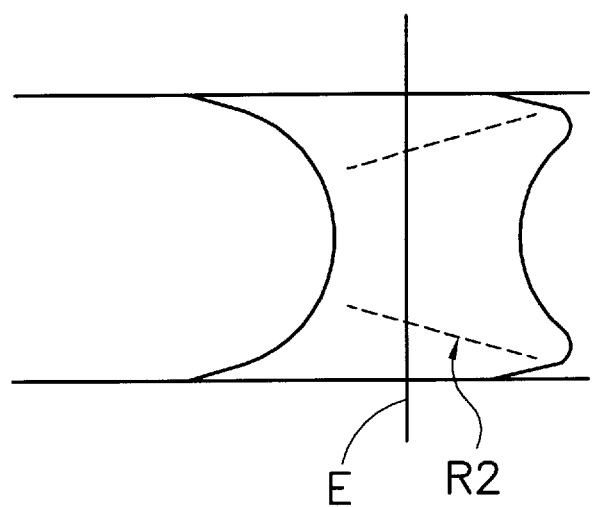

Under some conditions the flow velocity may slightly decrease at both ends in the width direction as a result of resistance of wall surfaces, particularly side wall surfaces, prior to reaching the dispersing flow exit. Therefore, if the flow velocity of the dispersing liquid supplied from the manifold is constant over the entire width, the flow at the center portion not affected by the resistance of the side wall surface may exceed the others, and as a result, a parabolic or trapezoidal flow velocity distribution occurs before the dispersing liquid reaches the discharge exit. When this flow suffers from pressure loss under the drawing effect of the slot-shaped dispersing liquid discharge exit E, as shown in FIG. 10B, a diagonal flow R2 directed from the center portion toward an end occurs to compensate non-uniformity of flow velocity in the width direction. This diagonal flow R2 may sometimes cause a non-uniform unit weight distribution or an abnormal fiber orientation at both ends in the web width direction.

We have found that this problem can be overcome by increasing the flow velocity of the dispersing liquid flowing in the inlet at both ends in the width direction. In the foregoing inlet, it is effective to use a higher flow velocity of the dispersing liquid flowing through the outermost section in the inlet than that in the inner sections, thereby compensating against the decrease in the flow velocity near the both side walls, and to form a flat flow velocity distribution even after passing through the slot-shaped discharge exit.

More specifically, in the inlet shown in FIG. 7C for example, the edge channels have a smaller sectional area than the other channels. The extent of reduction of sectional area of the edge channels is determined while considering the supply rate of the dispersing liquid and the length of the foregoing flow meeting portion. According to this method, the complete absence of operation of the incoming flow rate of the dispersing liquid ensures that the distribution of flow rate at the manifold or the ratio of reinforcing fibers and thermoplastic resin is not affected, thus making it possible to obtain a uniform unit weight distribution.

Means to reduce the channel width include insertion of a width reducing plate 39 (FIG. 7C) and formation of thick channel walls. In order to cope with changes in the sheet-making conditions as described above, it suffices to provide width reducing plates of various thicknesses and replace the plates in response to the conditions. To reduce the effect of side wall resistance on the dispersing liquid, use of a material having low frictional resistance (Teflon®, for example) is effective.

The slot-shaped discharge exit E can be formed by various means. As shown in FIG. 7A, use of an angled plate having an adjustable opening gives a high operability and a high general applicability. The plate 37 should preferably be installed vertically or with an inclination downward from above toward the dispersing liquid discharge exit. Installation of a plate with an upward inclination toward the dispersing liquid discharge exit is not usually recommended since it may lead to stagnation of the dispersing liquid.

In the foregoing inlet, furthermore, as shown in FIG. 7A, the rectifying effect is made more certain by installing a plurality of angled plates at intervals along the flow direction of the dispersing liquid.

Headbox of the present invention

Figure 8A:
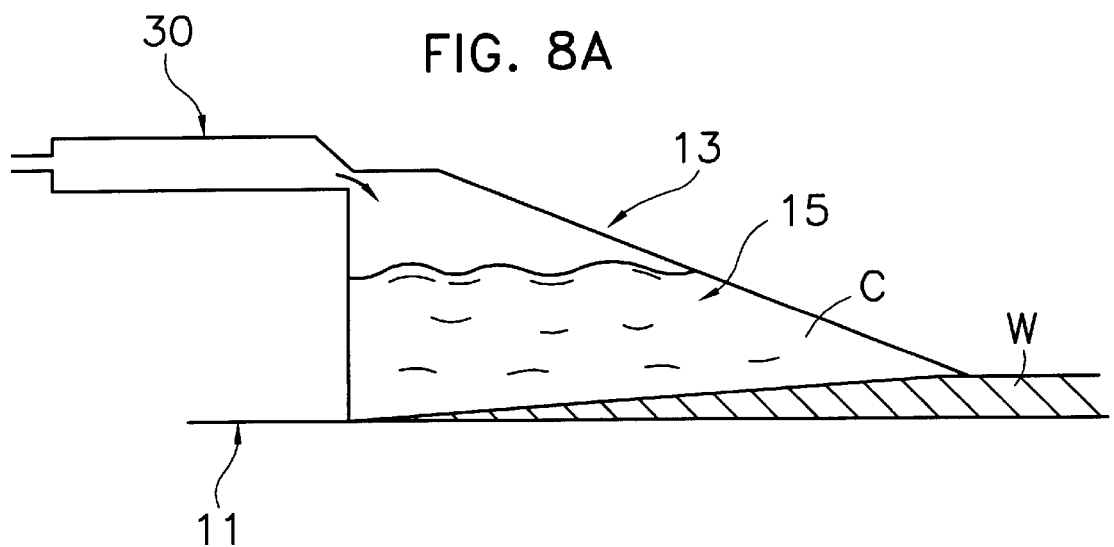
FIGS. 8A, 8B and 8C illustrate headboxes of the present invention.
Figure 8B:
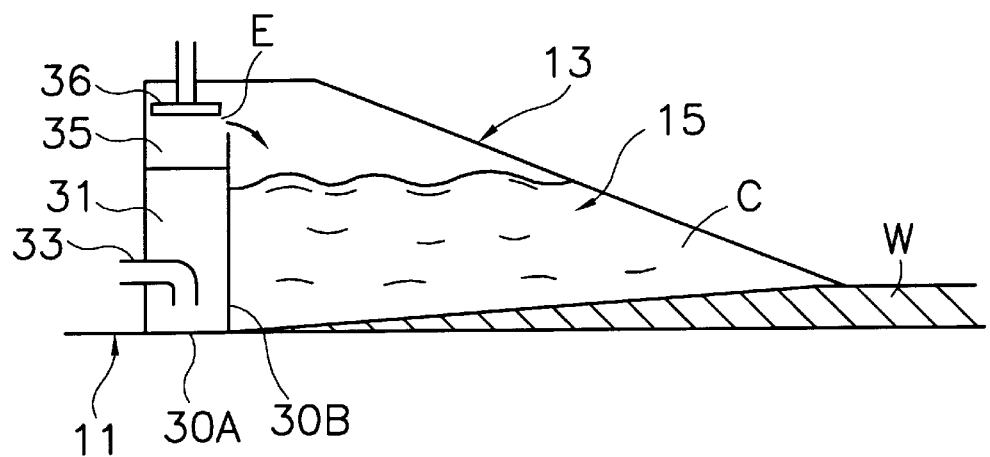
Figure 8C:
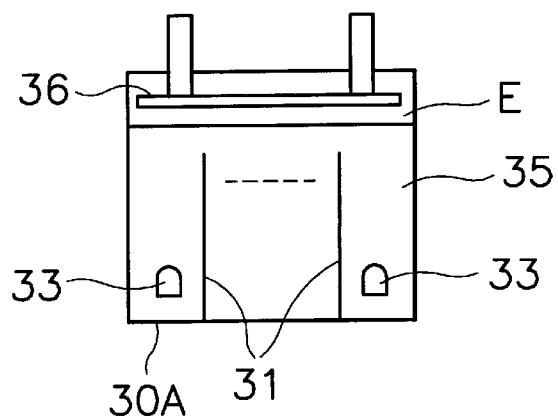

We have discovered a comprehensive and effective method for achieving, in the headbox 13, a uniform unit weight distribution in the width direction of the web by supplying a dispersing liquid which is uniform in solid concentration and flow rate onto the mesh belt 11. For this purpose, an effective method is to prevent any significant dynamic pressure of the dispersing liquid C and resultant rolling from reaching the mesh belt. This can be done by a structure as shown in FIGS. 8A, 8B and 8C. As shown, the dispersing liquid C sent from the inlet 30 to the headbox 13 is caused to stay on the mesh belt 11. This makes it possible to conduct web forming corresponding to the process known as the batch process even in a continuous manufacturing practice, and inhibits occurrence of a non-uniform unit weight distribution.

Separation of reinforcing fibers from a thermoplastic resin can be prevented by sucking the dispersing liquid C which accumulates on the mesh belt 11 by means of the suction box 12 (see FIG. 1) at a rate higher than the ultimate sedimentation rate of the thermoplastic resin particles in the dispersing liquid. Separation of foam from water when using a foamed dispersing liquid can also be prevented in a similar manner. The staying depth of the dispersing liquid is determined by taking account of the viscosity of the dispersing liquid, solid concentration and supply flow rate thereof, liquid sucking flow rate by the suction box 12, running speed and inclination angle of the mesh belt 11, and the bottom area of a staying section 15.

EXAMPLES

The present invention will now be described below by means of examples with reference to the drawings. The whole system of the wet-type manufacturing apparatus of a fiber reinforced thermoplastic resin sheet may have portions as shown in FIG. 1 except for those described in the following examples.

Apparatus 1

Figure 3B:
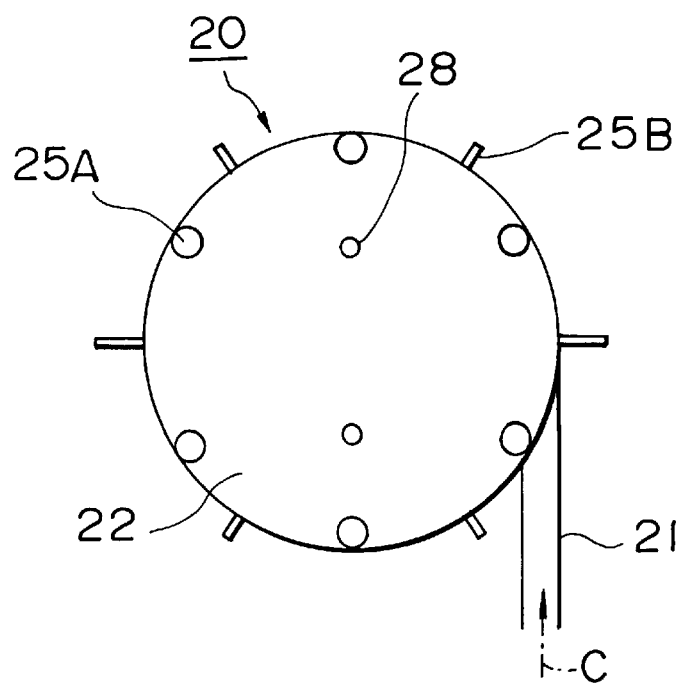

One of the manifolds of the shape of a vertical axis rotor used in the experiments is illustrated in FIGS. 3A and 3B : FIG. 3A is a side view and FIG. 3B is a top view. The manifold was cylindrical, with an inside diameter of 410 mm and a height of 300 mm. An inlet port 21 (inside diameter: 50 mm) for supplying the raw material dispersing liquid to the manifold 20 in a tangential direction was installed on the bottom side of the manifold 20, and its direction was aligned with the tangential direction of the cylindrical manifold. A conical guide section 24 projecting in the manifold was provided on the lower surface 23 to assist formation of a vertical circulation flow and a rotating flow as shown by the lines and arrows appearing in FIG. 2. Six distribution flow exits 25A (inside diameter: 20 mm) (discharge pipe group A) were provided on the upper surface 22, and six distribution flow exits 25B (inside diameter: 20 mm) (discharge pipe group B) were provided on the cylinder side 26 at a distance H=65 mm from the upper surface, all at equal intervals, making a total of 12 exits. The six distribution flow exits 25 of the discharge pipe group A were installed at equal intervals on concentric circles with a diameter of 390 mm on the upper surface 22 of the manifold 20 having an inside diameter of 410 mm. Two degassing ports 28 (FIG. 3B) were provided on the manifold upper surface 22 to confirm the presence of a foam retaining region.

Another manifold having the shape of a vertical axis rotor used in the experiment is illustrated in FIGS. 4A and 4B:

FIG. 4A is a side view, and FIG. 4B is a top plan view. The manifold was cylindrical, with an inside diameter of 410 mm and a height of 400 mm. An inlet port 21 (inside diameter: 50 mm) for supplying the raw material dispersing liquid to the manifold 20 was installed at the center of the circular plane of the upper surface 22 of the manifold. The lower surface 23 was provided with a six-blade turbine-type horizontal rotating stirrer 24a having an outside diameter of 250 mm. Details of the installation of the distributed flow exits 25A and 25B, and a degassing port 28 are the same as those for the manifold shown in FIGS. 3A and 3B.

Figure 11A:
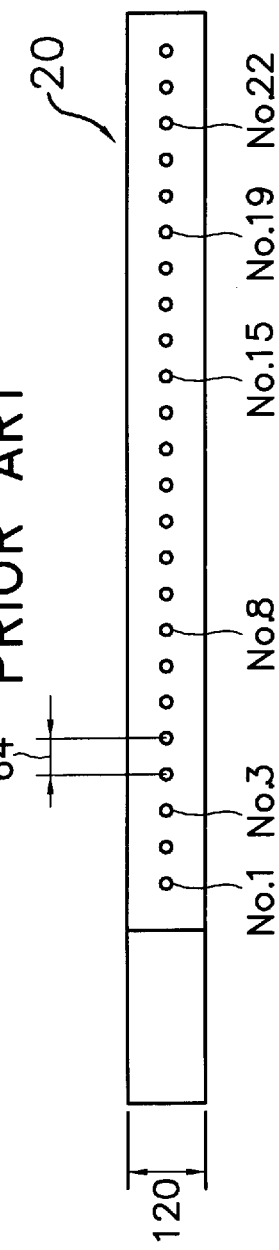
FIGS. 11A and 11B illustrate an embodiment of a conventional taper-type manifold.
Figure 11B:
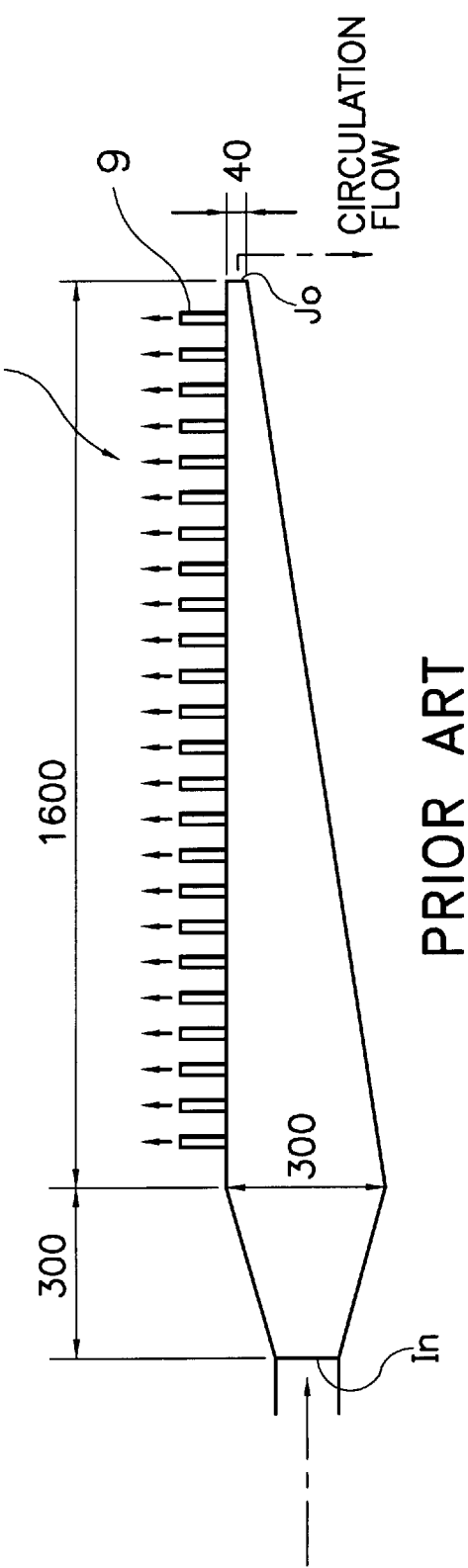

A taper-type manifold used in a conventional wet-type manufacturing apparatus is illustrated in FIGS. 11A and 11B: FIG. 11A is a top plan view and FIG. 11B is a side view. This manifold was provided with 24 branched pipes (hereinafter referred to as the "distribution flow exits") 9 arranged at equal intervals on the side surface of the taper portion. With a flow rate of the incoming dispersing liquid to the manifold of 1,640 L/min, and a circulation flow rate of 200 L/min of flowing in and out the manifold, the flow rate per one of the distribution flow exits 9 was set at 60 L/min as in the case of the foregoing manifold of the vertical axis rotor shape. The dispersing liquid was sampled from six distributed flow exits 9 Nos. 1, 3, 8, 15, 19 and 22. No. 1 distributed flow exit was spaced apart from No. 22 exit by a distance of 1,340 mm.

With the use of these manifolds, the following test of concentration distribution performance of the dispersing liquid was carried out.

Example 1-1

A raw material dispersing liquid C was prepared by adding glass fibers (GF) having a diameter of 11 μm and a length of 13 mm and polypropylene (PP) particles having an average particle size of 0.9 mm to a foamed aqueous solution. Both GF and PP had a weight concentration in the dispersing liquid of 0.35%. This dispersing liquid was supplied at a flow rate of 360 L/min from inlet port 21 to the manifold 20 of the shape of a vertical axis rotor as shown in FIG. 3A. The average flow rate, as determined by dividing the supply flow rate by the cross-sectional area of the inlet port 21 serving as the supply pipe was 3 m/s. Each of the distributed flow exits 25 had a flow rate of 60 L/min. Immediately after start of supply of the dispersing liquid to the manifold 20, the system was evacuated through the degassing port 28, and upon the lapse of 5 minutes thereafter, the dispersing liquid was sampled simultaneously from each of the distribution flow exits 25A (discharge pipe group A) or 25B (discharge pipe group B). Immediately after sampling, the degassing port 28 was released to confirm occurrence of a foam retaining region in the upper part of the manifold. This operation was repeated twice for each of the discharge pipe groups A and B. The dispersing liquid flowed out immediately after release, and there was not found any sign that a bubble retaining region occurred.

Glass fiber and PP particles were extracted through suction and filtration of the dispersing liquid sampled from each of the distribution flow exits, dried at 100° C. and weighed. Further, PP particles were burned in an air atmosphere at 600° C., and the remaining glass fibers were weighed.

In this manner, the GF concentration and the PP concentration were determined for each distribution flow exit in the discharge pipe groups A and B. In this test, a coefficient of variation CV-value was used as an indicator of uniform distribution property of the dispersing liquid concentrations. The CV-value represents in % a value obtained by dividing a standard deviation value of weight concentration in the foamed liquid of reinforcing fiber or thermoplastic resin flowing out from each distributed flow exit by the average concentration thereof. A large CV-value indicates a low uniform distribution.

The results are shown in Table 1. The concentration distribution is slightly superior in the discharge pipe group A to the discharge pipe group B, although the difference was slight.

TABLE 1

| | Manifold Shape | Discharge Pipe Group | CV-value GF (%) | PP (%) |
|---|---|---|---|---|
| Example 1-1 | FIG. 3 | A | 1.08 | 0.78 |
| | FIG. 3 | B | 1.40 | 1.10 |
| Example 1-2 | FIG. 4 | A | 0.63 | 1.01 |
| | FIG. 4 | B | 1.30 | 1.10 |
| Example 1-3 | FIG. 4 | A | 0.81 | 1.02 |
| | FIG. 4 | B | 3.22 | 2.86 |
| Comparative Example 1 | FIG. 11 | | 1.87 | 4.70 |

Example 1-2

The dispersing liquid was sampled in the same manner as in Example 1-1, using a manifold 20 having the shape of a vertical axis rotor 24a shown in FIG. 4A and setting a circumferential speed of the turbine-type stirring blade of 2.6 m/s. The degassing port 28 FIG. 4B was released immediately after sampling: the dispersing liquid flowed out immediately after releasing as in Example 1-1.

The results are shown in Table 1. The concentration distribution is slightly superior in the discharge pipe group A to the discharge pipe group B, although the difference was slight.

Example 1-3

The dispersing liquid was sampled in the same manner as in Example 1-2, using a manifold having the shape of a vertical axis rotor shown in FIG. 4A, by setting a circumferential speed of the turbine-type stirring blade of 1.3 mls.

When using the discharge pipe group A, the dispersing liquid immediately flowed out even when releasing the degassing port 28 immediately after sampling. When using the discharge pipe group B, in contrast, foam in a state close to a gas was discharged first after releasing of the degassing port immediately after sampling, and then the foamed liquid was discharged. This fact suggests that a foam retaining region S was formed in the manifold 20 as schematically shown in FIG. 4A.

The results are shown in Table 1. The GF concentration distribution is far superior in the discharge pipe group A to the discharge pipe group B. In this Example, a foam retaining region occurred when using the discharge pipe group B, and reinforcing fibers entrapped therein flow out irregularly from the dispersing flow exits, and this is considered to have caused fluctuations of the solid concentration.

Comparative Example 1

Figure 12:
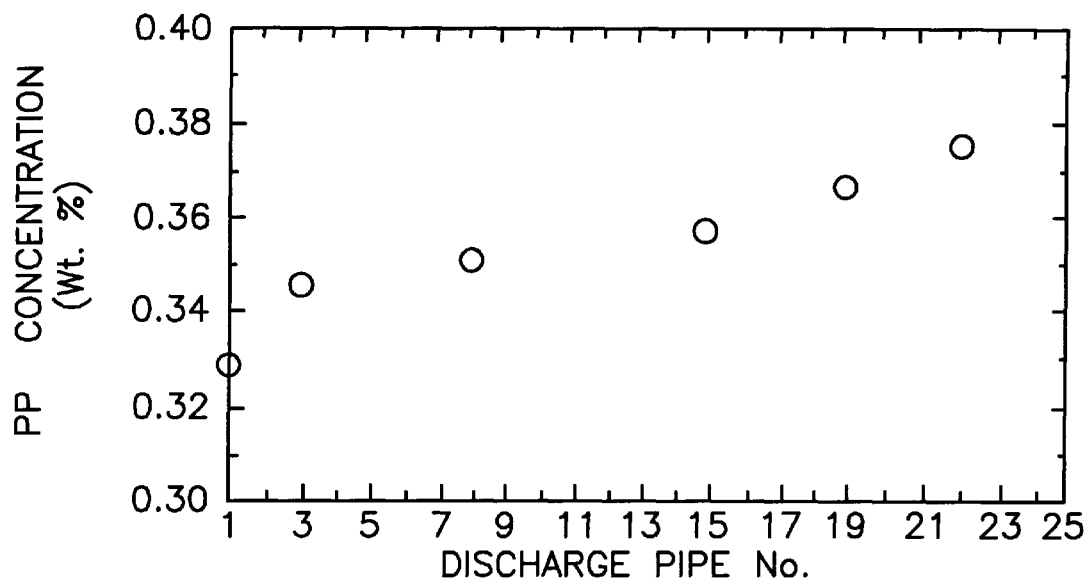
FIG. 12 is a graph illustrating the results of a PP concentration distribution performance test of the tape-type manifold shown in FIG. 11.

For comparison purposes, sampling of a dispersing liquid was conducted in the same manner as in Example 1-1 with the use of a taper-type manifold having dimensions as shown in FIGS. 11A and 11B. The results are shown in Table 1: these results suggest that the CV-value of PP concentration is large. Further, FIG. 12 gives values of PP concentration in the dispersing liquid for each distributed flow exit having conducted sampling. As is clear from FIG. 12, PP particles are thrown away to the circulation flow exit in the taper-type manifold.

Apparatus 2

Inlets used in the experiment are as follows:
Conventional inlet 1

Figure 13:
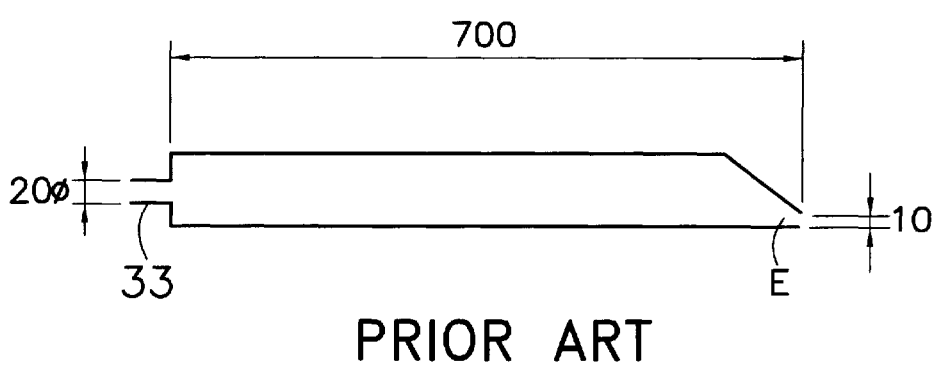
FIG. 13 is a sectional view of an embodiment of a conventional inlet.

As schematically illustrated in FIG. 13, the inlet had a height of 64 mm, a length of 700 mm, and a width of 1,500 mm, and the upper surface of the tip portion was reduced with a downward inclination toward the exit of the dispersing liquid. Hoses of distribution supply pipes 9 from the manifold were connected to 24 nozzles 33 having an inside diameter of 20 mm, arranged at equal intervals on the back thereof. The exit of the dispersing liquid onto the mesh belt formed a slit-shaped opening having a height of 10 mm.
Buffer-type inlet 1

Figure 5:
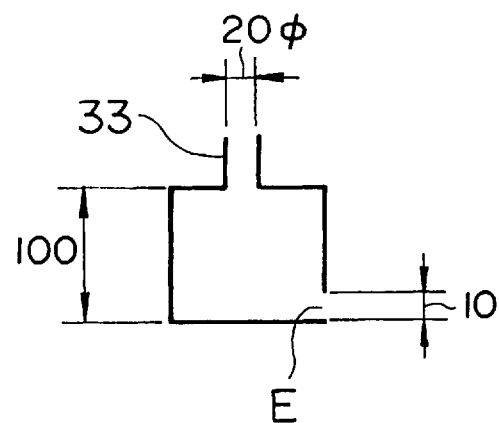
FIG. 5 is a sectional view of the inlet of an embodiment of the present invention.

As schematically shown in FIG. 5, the inlet was a box having a height of 100 mm, a length of 100 mm and a width of 1,500 mm, and hoses of distribution supply pipes from the manifold were connected to 24 nozzles 33 having an inside diameter of 20 mm, arranged at equal intervals on the upper surface thereof. The exit E of the dispersing liquid onto the mesh belt formed a slit-shaped opening having a height of 10 mm.
Buffer-type inlet 2

Figure 6:
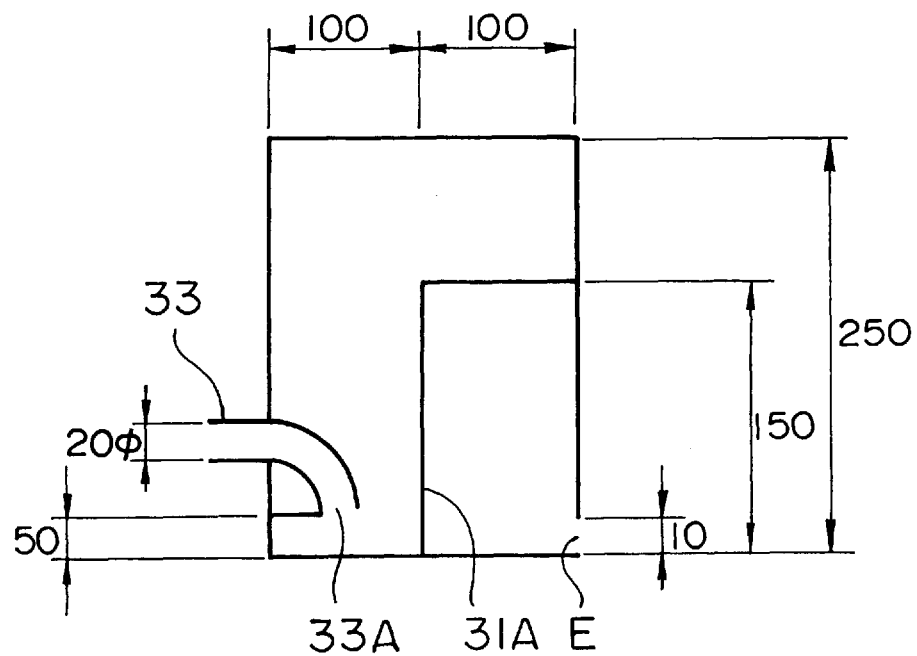
FIG. 6 is a sectional view of the inlet of another embodiment of the present invention.

As schematically illustrated in FIG. 6, the inlet was a box having a height of 250 mm, a length of 200 mm and a width of 1,500 mm, and a weir 31A having a height of 150 mm was installed vertical from the center on the bottom surface. Hoses of the distribution supply pipes 9 from the manifold 8 were connected to 6 elbow-shaped nozzles 33 having an inside diameter of 20 mm, arranged at equal intervals on the back thereof. The exit opening 33A of the nozzle 33 was opposed to the inlet 30 bottom with a distance of 50 mm. The exit of the dispersing liquid onto the mesh belt formed a slot-shaped opening having a height of 10 mm.
Buffer-type inlet 3

FIG. 7A represents a side view, and FIG. 7B schematically shows a top view. The inlet was a box having a height of 65 mm, a width of 1,500 mm and a total length of 700 mm, and 24 parallel divided channels 32 made with 23 partitions having a height of 400 mm were provided at equal intervals over the entire width in the upstream. In the upstream portion of these divided channels 32, hoses of the distribution supply pipe from the manifold were connected to elbow-shaped nozzles 33 having an inside diameter of 20 mm which were attached to the upper surface so that the sectional center conformed with the center line of each divided channel 32. The exit opening 33A of the nozzle 33 was opposed to the rear wall surface 30A of the inlet 30 at a distance of 50 mm.

Two angled plates 36 and 37 (FIG. 7A) were installed with a meeting section 35 having a gap of 100 mm in between, in front of the leading ends of these partitions 31. Each of the plates 36 and 37 was formed with a vertically slidable plate inserted with an inclination of 45° backward. The first plate 36 was installed at a position where there was a distance of 100 mm between the leading ends thereof (lower end) and the leading end of the partitions 31. The second sliced plate 37 was installed at a position where there was a distance of 300 mm from the leading ends of the partitions 31. The opening at the bottom of each of the plates 36 and 37 was adjustable.

Example 2-1
Conditions for preparation of dispersing liquid

A foamed aqueous solution was prepared in a dispersing tank 1. Glass fibers having a diameter of 11 gm and an average length of 13 mm in an amount of 0.4 wt.% and granular polypropylene having an average particle size of 0.9 mm in an amount of 0.6 wt.% were added, stirred and dispersed to prepare a dispersing liquid C.
Sheet-making conditions The dispersing liquid C sent at a flow rate of 1,440 L/min was distributed in the taper-type manifold 20 shown in FIGS. 11A and 11B into distribution supply pipes 9, and supplied through the buffer-type inlet shown in FIG. 5 onto the mesh belt 11 moving at a speed of 5.0 m/min (mesh opening: 200 μm, effective sheet-making width: 1,500 mm), thereby accomplishing sheet-making of a web W with a target unit weight distribution of 1,500 g/m$^2$.
Test results The resultant web W was divided in the width direction into 30 pieces after drying, and the unit weight value (CV value) of each piece was measured. The coefficient of variation CV-value was adopted as the indicator of the unit weight distribution as in Example 1. The results of test are shown in Table 2.

TABLE 2

|  | Manifold Shape | Inlet Shape | Dispersing liquid staying depth | CV-value of unit weight in width direction (%) |
| --- | --- | --- | --- | --- |
| Example 2-1 | FIG. 11 | FIG. 5 | 30 mm | 4.5 |
| Example 2-2 | FIG. 11 | FIG. 6 | 30 mm | 3.1 |
| Example 2-3 | FIG. 11 | FIG. 7 A, B | 30 mm | 2.3 |
| Example 2-4 | FIG. 11 | FIG. 7 A, B | 30 mm | 2.1 |
| Example 2-5 | FIG. 11 | FIG. 7 c | 30 mm | 2.0 |
| Comparative Example 2 | FIG. 11 | FIG. 13 | 30 mm | 6.5 |
| Example 3 | FIG. 11 | FIG. 13 | 200 mm | 2.5 |

Example 2-2

Sheet-making and evaluation of web were conducted, by using the buffer-type inlet 2 shown in FIG. 6, under the same conditions as in Example 2-1. The results are shown in Table 2.

Example 2-3

Sheet-making and evaluation of web W were conducted, by using the buffer-type inlet shown in FIGS. 7A and 7B, under the same conditions as in Example 2-1. The leading end of the first plate 36 was raised so as to avoid contact with the surface of the dispersing liquid C. The second plate 37 had an opening of 10 mm. The results are shown in Table 2.

Example 2-4

Sheet-making and evaluation of web W were conducted, by using the buffer-type inlet shown in FIGS. 7A and 7B, under the same conditions as in Example 2-1. In this Example, the first plate 36 had an opening of 15 mm, and the second plate 37 had an opening of 10 mm. The results are shown in Table 2.

Example 2-5

As shown in the top view of FIG. 7C, an experiment was carried out by inserting a width reducing plate 39 into the outermost channel of the buffer-type inlet 3. The width reducing plate 39 was inserted in contact from inside with the partition 31 and the inlet side wall 38 so that the channel sectional area after insertion become 80% of that before insertion. The leading end of the width reducing plate 39 was made thinner toward the tip so that occurrence of a fan-shaped flow is not promoted under the effect of the difference in thickness as compared with the partition 31 near the channel exit.

Sheet-making and evaluation of web W were conducted, with an opening of the first sliced plate 36 of the inlet of 16 mm and an opening of the second sliced plate of 10 mm, and under the same conditions as in Example 2-1. The results are shown in Table 2.

Comparative Example 2

Sheet-making and evaluation of web W were conducted, by using the conventional inlet shown in FIG. 13, under the same conditions as in Example 2-1. The results are shown also in Table 2.

Apparatus 3

A side view of the reservoir headbox used in Example 3 is schematically illustrated in FIG. 8A. The holding section 15 of the headbox has substantially the same width as the mesh belt 11 and is located directly thereabove. The upper surface thereof forms a downward slant from rear toward the leading end. This section 15 had a large height, and kept the dispersing liquid at a prescribed depth on the mesh belt 11 to ensure staying thereof. In this Example, the headbox had a height of 300 mm.

Example 3

Sheet-making of web W was performed, by using the taper-type manifold shown in FIG. 11, the conventional inlet shown in FIG. 13 and the reservoir headbox 13, under the same conditions as in Example 2-1. The staying depth of the dispersing liquid on the mesh belt was 200 mm. The resultant web was divided into 30 pieces in the width direction after drying, and the unit weight value was measured for each piece to determine the coefficient of variation CV-value. The results are shown in Table 2.

Example 4

Sheet-making of a further uniform unit weight distribution in the width direction was carried out by using the combination of the manifold having the shape of a vertical axis rotor, the buffer-type inlet and the reservoir headbox of the present invention.

Example 4-1

Sheet-making of a web W was conducted under the same conditions as in Example 2-2, by using a manifold of the shape of a vertical axis rotor, provided with 24 distribution flow exits arranged at equal intervals on concentric circles on the upper surface thereof, with a solid distributing performance equal to that of the manifold shown in FIGS. 4A and 4B, and the buffer-type inlet shown in FIG. 6. The resultant web was dried, and then divided into 30 pieces in the width direction. The unit weight value was measured for each piece to determine the coefficient of variation CV-value. The results are shown in Table 3.

TABLE 3

| | Manifold Shape | Inlet Shape | Dispersing liquid staying depth | CV-value of unit weight in width direction (%) |
|---|---|---|---|---|
| Example 4-1 | cylindrical | FIG. 6 | 30 mm | 2.2 |
| Example 4-2 | cylindrical | FIG. 7A, B | 30 mm | 1.2 |
| Example 4-3 | cylindrical | FIG. 8B, C | 200 mm | 0.9 |

Example 4-2

Sheet-making of web W was carried out under the same conditions as in Example 2-4, by using the manifold having the shape of a vertical axis rotor as in Example 4-1, and the buffer-type inlet shown in FIGS. 7A and 7B. The resultant web was dried, and then divided into 30 pieces in the width direction. The unit weight value was measured for each piece to determine the coefficient of variation CV-value. The results are shown in Table 3.

Example 4-3

Sheet-making of web W was conducted under the same conditions as in Example 3, by using the manifold having the shape of a vertical axis rotor as in Example 4-1, the buffer-type inlet of which the side view and the back view are illustrated in FIGS. 8A and 8B, respectively, and the reservoir headbox.

This Example is characterized in that an inlet having performance equivalent to that of the buffer-type inlet 3 shown in FIGS. 7A and 7B was longitudinally installed to the reservoir headbox. More specifically, this vertically arranged buffer-type inlet was integrally formed through an inlet partition 34B on the rear side in the line direction of the holding section 15 of the reservoir headbox 13 (FIG. 8B), and the dispersing liquid inlet port opened toward a dispersing liquid buffer face 30A located on the bottom of the inlet. The dispersing liquid C collided with the dispersing liquid buffer face 30A, changed its direction, went up in the sections divided by vertical partition strips 31 as an ascending flow, met together in the meeting section 35 above and beyond the ends of the partitions 31, and overflowed from an overflow port E at the top of an inlet partition 30B into the staying section 15. In this case, the plate 36 comprised a horizontal plate arranged so as to restrict the overflow exit E from above, and rectified the flows into a stable flow by inhibiting movement of the liquid surface by coming into contact with the liquid surface of the dispersing liquid C overflowing from the overflow exit E.

The resultant web was dried, and then divided into 30 pieces in the width direction. The unit weight value was measured for each piece to determine the coefficient of variation CV-value. The results are shown in Table 3.

What is claimed is:

1. An apparatus for manufacturing a fiber reinforced thermoplastic resin sheet comprising:
   (a) a dispersion supply container comprising container means for containing a dispersing liquid comprising a reinforcing fiber and a resin;
   (b) a manifold connected to said dispersion supply container, said manifold including a shell having a substantially central axis wherein said shell is substantially symmetrically shaped around said axis;
   (c) a dispersing liquid inlet and a plurality of dispersing liquid outlets symmetrically positioned about said shell axis, whereby dispersing liquid introduced into said manifold through said inlet is substantially spirally and/or vertically circulated within said shell prior to exiting through said outlets; and (d) a distributor connected to said manifold to receive dispersing liquid from said outlets to substantially uniformly distribute said dispersing liquid to make a fiber reinforced thermoplastic resin sheet.

2. The apparatus of claim 1, wherein said distributor has a plurality of dispersing liquid inlets provided with buffer surfaces where said dispersing liquid is caused to forcibly impact.

3. The apparatus of claim 1, wherein said distributor comprises a reservoir headbox having a structure capable of dispensing said dispersing liquid to at least a prescribed depth on a moving endless mesh belt.

4. The apparatus of claim 1, wherein said shell is substantially cylindrically shaped.

5. The apparatus of claim 4, wherein said manifold has a ratio of height to diameter of about 0.3 to 3.0.

6. The apparatus of claim 1, wherein said outlets have substantially equal diameters and are located at substantially an equal height on said shell.

7. The apparatus of claim 1, wherein said inlet is positioned to introduce said dispersing liquid in a direction tangential to said shell.

8. The apparatus of claim 1, wherein said inlet is positioned to introduce said dispersing liquid along the central axis.

9. The apparatus of claim 1, wherein said manifold further comprises a stirrer rotating about the central axis.

10. The apparatus of claim 1, wherein said outlets are arranged at equal intervals on substantially one concentric circle around the center axis.

11. The apparatus of claim 1, wherein said outlets exit vertically upward from said manifold.

12. An apparatus for manufacturing a fiber reinforced thermoplastic resin sheet comprising:

(a) a dispersion supply container containing a dispersing liquid containing a reinforcing fiber and a resin;

(b) a manifold connected to said dispersion supply container, said manifold having a plurality of dispersing liquid outlets; and (c) a distributor connected to said manifold with a plurality of pipes, said distributor comprising a buffer inlet adapted to cause said dispersing liquid to forcibly impact a buffer surface interposed in a flow path of said dispersing liquid, and wherein the interior of said buffer inlet is divided into a plurality of receiving sections, each section receiving said dispersing liquid and flows of the dispersing liquid joining after each section and prior to delivering said dispersing liquid to a headbox.

13. The apparatus of claim 12, wherein said buffer inlet has an outlet opening having the same width as a suction filtration region of said headbox.

14. The apparatus of claim 12, wherein said buffer inlet further comprises a plate extending into said flow path and forming an adjustable opening to form a slot-shaped opening having the same width as the suction filtration region of said headbox.

15. The apparatus of claim 12, wherein said buffer inlet is provided with a plurality of said plates extending into said flow path at intervals to provide a plurality of slot-shaped openings spaced apart from one another along the flow direction of said dispersing liquid.

16. The apparatus of claim 12, wherein said buffer surface extends at a right angle to said flow path.

17. The apparatus of claim 12, wherein outermost ones of said receiving sections have a cross-sectional area that is smaller than that of other sections.

18. An apparatus for manufacturing a fiber reinforced thermoplastic resin sheet comprising:

(a) a dispersion supply container containing a dispersing liquid containing a reinforcing fiber and a resin;

(b) a manifold connected to the dispersion supply container; and (c) a distributor connected to said manifold, said distributor comprising a reservoir headbox capable of dispensing and maintaining said dispersing liquid at a predetermined depth on a moving endless mesh belt.

19. The apparatus of claim 18, wherein said predetermined depth is a depth at which rolling caused by the dispersing liquid flowing into the headbox does not reach above said mesh belt.

20. An apparatus for manufacturing a fiber reinforced thermoplastic resin sheet comprising:

(a) a dispersion supply container containing a dispersing liquid containing a reinforcing fiber and a resin;

(b) a manifold connected to said dispersion supply container, said manifold having a plurality of dispersing liquid outlets; and (c) a distributor connected to said manifold with a plurality of pipes, said distributor being divided into a holding section, a buffer inlet, and a dispensing section by a substantially vertically oriented divider, said holding section being divided by partitions into a plurality of receiving sections connected to said manifold, said buffer inlet adapted to cause said dispersing liquid to forcibly impact a buffer surface interposed in a flow path of said dispersing liquid in said receiving sections, and said dispensing section capable of dispensing and maintaining, said dispersing liquid at a predetermined depth on a moving endless mesh belt, whereby dispersing liquid enters lower portions of said receiving sections, travels upwardly to an upper portion of said divider, mixes together and flows beyond said divider and into said dispensing section.

21. The apparatus of claim 20 further comprising a plate providing a slot-shaped opening which is positioned at an upper portion of said holding section to adjust flow of dispersing liquid into said dispensing section.

22. An apparatus for manufacturing a fiber reinforced thermoplastic resin sheet comprising:

(a) a dispersion supply container containing a dispersing liquid containing a reinforcing fiber and a resin;

(b) a manifold connected to said dispersion supply container, said manifold having a plurality of dispersing liquid outlets; and (c) a distributor connected to said manifold with a plurality of pipes, said distributor comprising a buffer inlet adapted to cause said dispersing liquid to forcibly impact a surface interposed in a flow path of said dispersing liquid, and further comprising at least one weir positioned in said flow path after said buffer inlet, prior to delivering said dispersing liquid to a headbox.

23. An apparatus for manufacturing a fiber reinforced thermoplastic resin sheet comprising:

(a) a dispersion supply container containing a dispersing liquid containing a reinforcing fiber and a resin;

(b) a manifold connected to said dispersion supply container, said manifold including a shell having a substantially central axis wherein said shell is substantially symmetrically shaped around said axis;

(c) a dispersing liquid inlet and a plurality of dispersing liquid outlets symmetrically positioned about said shell axis;

wherein dispersing liquid introduced into said manifold through said inlet is substantially spirally and/or vertically circulated within said shell prior to exiting through said outlets; and (d) a distributor connected to said manifold with a plurality of pipes, said distributor comprising a buffer inlet adapted to cause said dispersing liquid to forcibly impact a buffer surface interposed in a flow path of said dispersing liquid, and wherein the interior of said buffer inlet is divided into a plurality of receiving sections, each section receiving said dispersing liquid and flows of the dispersing liquid joining after each section and prior to delivering said dispersing liquid to a headbox.

24. An apparatus for manufacturing a fiber reinforced thermoplastic resin sheet comprising:

(a) a dispersion supply container containing a dispersing liquid containing a reinforcing fiber and a resin;

(b) a manifold connected to said dispersion supply container, said manifold including a shell having a substantially central axis wherein said shell is substantially symmetrically shaped around said axis;

(c) a dispersing liquid inlet and a plurality of dispersing liquid outlets symmetrically positioned about said shell axis, whereby dispersing liquid introduced into said manifold through said inlet is substantially spirally and/or vertically circulated within said shell prior to exiting through said outlets; and (d) a distributor connected to said manifold with a plurality of pipes, said distributor being divided into a holding section, a buffer inlet, and a dispensing section by a substantially vertically oriented divider, said holding section being divided by partitions into a plurality of receiving sections connected to said manifold, said buffer inlet adapted to cause said dispersing liquid to forcibly impact a buffer surface interposed in a flow path of said dispersing liquid in said receiving sections, and said dispensing section capable of dispensing and maintaining said dispersing liquid at a predetermined depth on a moving endless mesh belt, whereby dispersing liquid enters lower portions of said receiving sections, travels upwardly to an upper portion of said divider, mixes together and flows beyond said divider and into said dispensing section.

* * * * *

UNITED STATES PATENT AND TRADEMARK OFFICE
CERTIFICATE OF CORRECTION

PATENT NO. : 5,888,352
DATED : March 30, 1999
INVENTOR(S) : Yoshikawa et al

It is certified that error appears in the above-identified patent and that said Letters Patent is hereby corrected as shown below:

In Column 12, at approximately line 43, please change "mls" to --m/s--.

In Column 16 at line 34, please change "34B" to --30B--.

Signed and Sealed this

Thirty-first Day of August, 1999

*Attest:*

Q. TODD DICKINSON

*Attesting Officer*     *Acting Commissioner of Patents and Trademarks*